(12) United States Patent
Malkamäki et al.

(10) Patent No.: US 7,668,192 B2
(45) Date of Patent: Feb. 23, 2010

(54) USE OF THE FP HEADER TO SIGNAL THE RNC THAT THE NODE B HAS NOT BEEN ABLE TO DETERMINE OR HAS NOT BEEN ABLE TO ACCURATELY DETERMINE THE NUMBER OF RETRANSMISSIONS

(75) Inventors: Esa Malkamäki, Espoo (FI); Masatoshi Nakamata, Kanagawa (JP)

(73) Assignee: Nokia Corporation, Espoo (FI)

( * ) Notice: Subject to any disclaimer, the term of this patent is extended or adjusted under 35 U.S.C. 154(b) by 617 days.

(21) Appl. No.: 11/323,467

(22) Filed: Dec. 30, 2005

(65) Prior Publication Data
US 2006/0146889 A1   Jul. 6, 2006

Related U.S. Application Data

(60) Provisional application No. 60/641,913, filed on Jan. 5, 2005.

(51) Int. Cl.
*H04J 12/42* (2006.01)
(52) U.S. Cl. .................................. 370/455; 370/522
(58) Field of Classification Search ................. 370/506, 370/514, 349, 455, 522; 714/579
See application file for complete search history.

(56) References Cited

U.S. PATENT DOCUMENTS 6,574,226 B1 *  6/2003  Nakano et al. ......... 370/395.64

| | | |
|---|---|---|
| 2004/0160925 A1 | 8/2004 | Heo et al. |
| 2007/0079207 A1 * | 4/2007 | Seidel et al. ................ 714/748 |
| 2007/0081492 A1 * | 4/2007 | Petrovic et al. ............. 370/331 |

OTHER PUBLICATIONS

HARQ retransmission and failure Indication for Improved Outer Loop Power Control; R3-041503; 3GPP TSG-RAN WG3 Meeting #45; Shin-Yokohama, Japan, Nov. 2004.
Unknown HARQ Retransmission Number in Node B; R3-050211; 3GPP TSG-RAN WGE Meeting #46, Feb. 2004.
Indication of Unknown RSN; R3-050494; 3GPP TSG-RAN WG3 #47 meeting, May 1, 2005; www.3gpp.org.
Supplementary European Search Report (Application No. 05826554.7) dated May 3, 2009 (3 pages) and Form 2906 (6 pages).
Ericsson: "E-DCH HARQ protocol—R2-041617" 3GPP TSG-RAN WG2 meeting #43, Aug. 16-20, 2004, XP-002318191, 4 pages.

* cited by examiner

*Primary Examiner*—Seema S Rao
*Assistant Examiner*—Sai-Ming Chan

(57) ABSTRACT

The FP header is used to signal the RNC that the Node B has not been able to determine or has not been able to accurately determine the number of retransmissions. A first embodiment is to reserve a bit pattern for use in the 'Number of HARQ retransmissions' field on the Iub frame protocol DATA FRAME header to indicate that Node B does not know the actual number of retransmissions. A second embodiment is to define a one bit flag on Iub/Iur FP DATA FRAME header to indicate that the value set in the "Number of HARQ Retransmissions" in the FP header is an estimated/guessed value by Node B or not.

28 Claims, 4 Drawing Sheets

| Header CRC | FT |
|---|---|
| CFN ||
| Num of MAC-es PDUs ||
| Subframe Number | Num of HARQ retrans | Spare |

FIG. 3(a)
(PRIOR ART)

| Header CRC | FT |
|---|---|
| CFN ||
| Num of MAC-es PDUs ||
| Subframe Number | Num of HARQ retrans | Spare |

| Header CRC | FT |
|---|---|
| CFN ||
| Num of MAC-es PDUs ||
| Subframe Number | Num of HARQ retrans | Spare |

USE OF THE FP HEADER TO SIGNAL THE RNC THAT THE NODE B HAS NOT BEEN ABLE TO DETERMINE OR HAS NOT BEEN ABLE TO ACCURATELY DETERMINE THE NUMBER OF RETRANSMISSIONS

CROSS-REFERENCE TO RELATED APPLICATION

This application claims priority from U.S. Provisional Patent Application No. 60/641,913 filed on Jan. 5, 2005.

BACKGROUND OF THE INVENTION

1. Technical Field

The field of the invention is mobile communications and, more particularly, to reporting of retransmissions from user equipment to a base station for use for instance by a serving radio network controller in outer loop power control.

2. Discussion of Related Art

The invention relates to the 3GPP (Third Generation Partnership Project) specification of the Universal Mobile Telecommunications System (UMTS) Terrestrial Radio Access (UTRA) and more specifically to the Wideband Code Division Multiple Access (WCDMA) High Speed Uplink Packet Access (HSUPA) which is an enhanced uplink feature used in the Frequency Division Duplex (FDD) mode. This feature is being specified in the 3GPP and targeted to 3GPP release 6.

Referring to FIG. 1, the Universal Mobile Telecommunications System (UMTS) packet network architecture includes the major architectural elements of user equipment (UE), UMTS Terrestrial Radio Access Network (UTRAN), and core network (CN). The UE is interfaced to the UTRAN over a radio (Uu) interface, while the UTRAN interfaces to the core network over a (wired) Iu interface.

FIG. 2 shows some further details of the architecture, particularly the UTRAN. The UTRAN includes multiple Radio Network Subsystems (RNSs), each of which contains at least one Radio Network Controller (RNC). Each RNC may be connected to multiple Node Bs which are the 3GPP counterparts to GSM base stations. Each Node B may be in radio contact with multiple UEs via the radio interface (Uu) shown in FIG. 1. A given UE may be in radio contact with multiple Node Bs even if one or more of the Node Bs are connected to different RNCs. For instance a UEI in FIG. 2 may be in radio contact with Node B 2 of RNS 1 and Node B 3 of RNS 2 where Node B 2 and Node B 3 are neighboring Node Bs. The RNCs of different RNSs may be connected by an Iur interface which allows mobile UEs to stay in contact with both RNCs while traversing from a cell belonging to a Node B of one RNC to a cell belonging to a Node B of another RNC. One of the RNCs will act as the "serving" or "controlling" RNC (SRNC or CRNC) while the other will act as a "drift" RNC (DRNC). A chain of such drift RNCs can even be established to extend from a given SRNC. The multiple Node Bs will typically be neighboring Node Bs in the sense that each will be in control of neighboring cells. The mobile UEs are able to traverse the neighboring cells without having to re-establish a connection with a new Node B because either the Node Bs are connected to a same RNC or, if they are connected to different RNCs, the RNCs are connected to each other. During such movements of a UE, it is sometimes required that radio links be added and abandoned so that the UE can always maintain at least one radio link to the UTRAN. This is called soft-handover (SHO).

It has been agreed in 3GPP HSUPA standardization that the UE transmits RSN (retransmission sequence number) on E-DPCCH (enhanced-dedicated physical control channel) together with data transmission on E-DCH (enhanced-dedicated channel). Node B "knows" the redundancy version to be used from RSN. Node B can also adjust its retransmission counter based on RSN. Furthermore, it has been agreed that Node B reports the number of retransmissions (4 bit field is reserved in FP header) required to receive the block correctly to the SRNC. Outer loop power control (OLPC) can use this information to adjust SIR targets and power offsets of different channels.

The RSN is specified to be 2 bits, i.e., it can have values 0, 1, 2 and 3. It has been specified that RSN saturates to 3 even if there are more than 3 retransmissions, i.e., RSN takes values 0, 1, 2, 3, 3, 3 when there are more than 3 retransmissions. If a Node B misses (i.e., does not even receive E-DPCCH) first three (or more) transmissions (which may be typical in SHO case) but receives then, e.g., two transmissions (both with RSN=3), soft combines them and finally decodes the block correctly. Then Node B sends the correctly received block to SRNC and should tell to the SRNC the number of retransmissions required for this block. However, the Node B does not "know" when the transmissions of this block were started: it may have missed 3, 4, 5, etc. transmissions, in all cases RSN=3.

Concerning the "knowledge" of Node B, a problem occurs when the first transmission that Node B receives is with RSN=3, then Node B does not (necessarily) "know" when the first transmission was sent.

Node B is able to determine and therefore "knows" if it receives a transmission from UE with RSN=0, 1 or 2. Even if those are all incorrect and UE then retransmits with RSN=3 (one or several times), Node B can count, i.e., can calculate, the number of retransmissions.

Some examples follow:

| UE transmits RSN: | 0 | 1 | 2 | 3 | 3 | 3 |
|---|---|---|---|---|---|---|
| Node B receives: | — | 1 | — | 3 | — | 3 |

In this example Node B can count that the actual number of retransmissions is five (after the first (RSN=0) transmission). A hyphen (-) indicates that Node B completely missed that transmission, i.e., could not decode RSN or E-DPCCH where RSN is sent; 1 above indicates that Node B received E-DPCCH correctly and read RSN=1 from there, but did not decode the data on E-DPDCH correctly and therefore requested retransmission; second and fourth retransmission was missed completely (even E-DPCCH); a third retransmission (RSN=3) was received and combined with retransmission 1 but the data was not yet correct; finally, a fifth retransmission when combined with the first and third retransmissions resulted in correct decoding of the data and an ACK was sent to the UE and correctly received data was sent to RNC (in FP data frame) and 'Num of HARQ retrans'=5 (=0101) was reported in the FP header.

A second example follows:

| UE transmits RSN: | 0 | 1 | 2 | 3 | 3 |
|---|---|---|---|---|---|
| Node B receives: | 0 | — | — | 3 | 3 |

In this example Node B can count that the actual number of retransmission is four.

A third example follows:

| UE transmits RSN: | 0 | 1 | 2 | 3 | 3 |
|---|---|---|---|---|---|
| Node B receives: | — | — | — | 3 | 3 |

In this third example Node B cannot necessarily count that the actual number of retransmission is 4, and it is therefore not necessarily able to accurately indicate the number of retransmissions in the FP header. If the number of transmissions is limited to say five transmissions (i.e., four retransmissions), then in the last case Node B knows that there has been 4 retransmissions and can report this. This is an example of why we cannot always rely only on RSN received from UE to decide whether Node B knows or not (i.e., there can be some additional information available (max number of transmissions in this example)).

DISCLOSURE OF INVENTION

An object of the present invention is to provide a solution to the above described problem that can be applied to that situation and to similar problem situations.

Node B operation is not defined in the above third example. It could try and guess when the transmissions started. If it does, the question arises whether the RNC should be informed that this is an estimate or simply that it could not be determined The idea is to use the FP header to signal the RNC that the Node B has not been able to determine or has not been able to accurately determine the number of retransmissions.

One way to do this is to reserve one 'Number of HARQ retransmissions' codeword on the Iub frame protocol DATA FRAME header to indicate that Node B does not know the actual number of retransmissions.

Another way is to define a one bit flag on Iub/Iur FP DATA FRAME header to indicate that the value set in the Number of HARQ Retransmission in the FP header is an estimated/guessed value by Node B or not, i.e. right value.

In both cases, the Node B should have means to signal to the RNC that it does not know the exact number of retransmissions. In the way where a flag is used, the flag should be set only when Node B 'guesses' the number of retransmissions. When Node B knows/estimates it (i.e., does not guess it), it should report the (correct) value in both cases. The difference between the first way and the second way is how to handle the case where Node B does not know (and cannot estimate): According to the first way, one code word of 'Num of HARQ retrans' field is reserved and the second way is to add a 1 bit flag to that (and that flag could be sent instead of 'spare' bit in the FP header).

The first way has the advantage that no additional bits are needed whereas the second way has the advantage that some (although unreliable) 'guestimate' of the number of retransmissions can be given in addition to the flag.

According to both ways, however, there should be means for Node B to indicate to RNC that it does not know the actual number of retransmissions. As mentioned above, one way is to reserve one code word and another way is to add a 1 bit flag to indicate that fact.

Although the present specification discloses the invention in the context of an improvement to an HSUPA situation, it should be realized that the core concept is applicable to other situations in wireless interfaces and not limited to HSUPA and not limited to the uplink direction.

BRIEF DESCRIPTION OF THE DRAWING

FIG. 3(a) shows part of a prior art Frame Protocol (FP) Data Frame header.

FIG. 3(b) shows the FP Data Frame header with a codeword reserved, according to a first embodiment of the present invention to carry out the above-mentioned first way of using the FP header to signal the RNC that the Node B has not been able to determine or has not been able to accurately determine the number of retransmissions.

FIG. 3(c) shows a spare bit used, according to a second embodiment of the present invention, to carry out the above-mentioned second way of using the FP header to signal the RNC that the Node B has not been able to determine or has not been able to accurately determine the number of retransmissions.

BEST MODE FOR CARRYING OUT THE INVENTION

Figure 1:
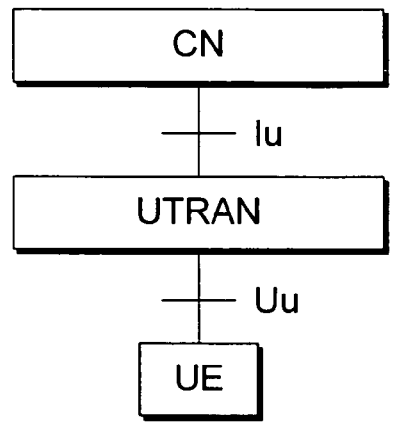
FIG. 1 shows the packet network architecture for the prior art Universal Mobile Telecommunications System (UMTS).
Figure 2:
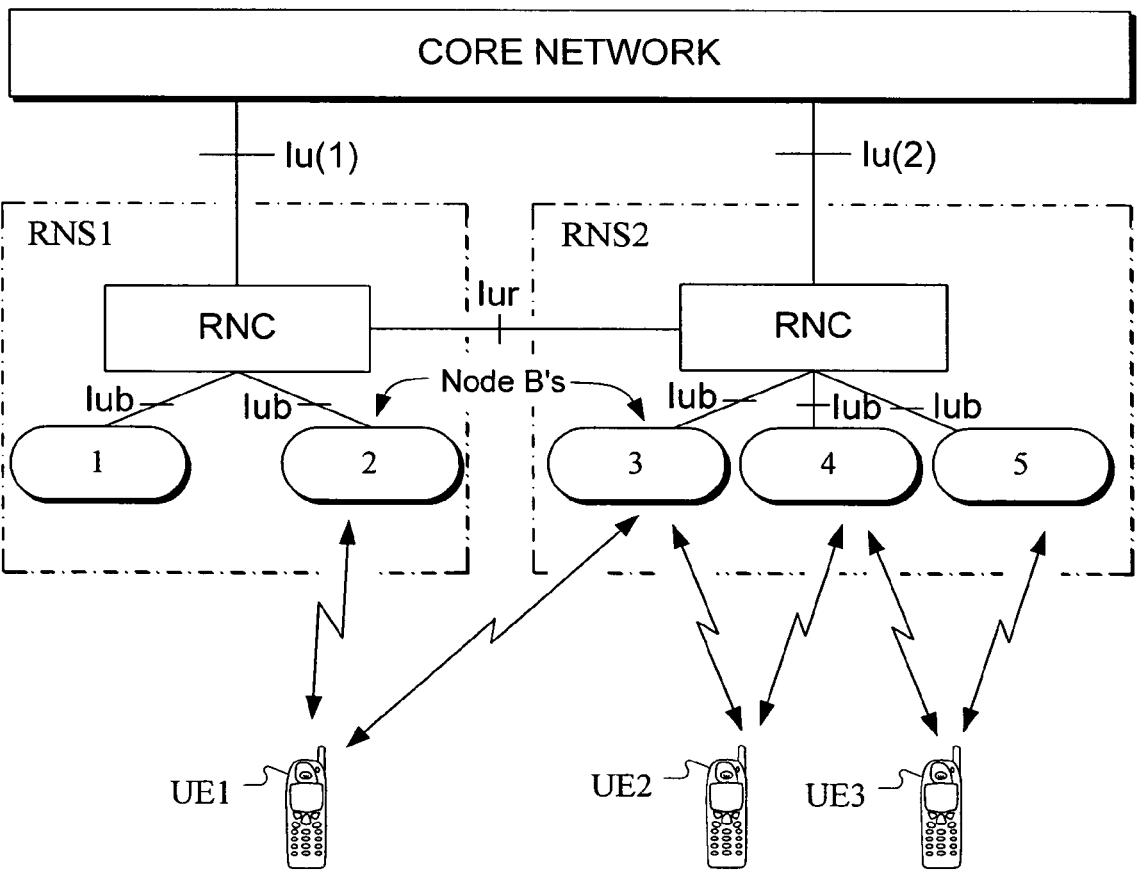
FIG. 2 shows some further details of the overall architecture of the prior art UMTS.

It should first of all be realized that the exact frame structure shown in FIGS. 3(a)-(c) are merely illustrative and the invention is not tied to any particular structure shown here but can be adapted according to changes in the structure that may develop later.

FIG. 3(a) shows a possible frame protocol (FP) header (part of the header) for E-DCH that has been proposed in the 3GPP standardization process. There, the field 'Num of HARQ retrans' tells the number of retransmissions that were needed. According to a first embodiment of the present invention, this field could have special value to indicate that Node B does not know the number of retransmissions.

For instance, as shown in FIG. 3(b), codeword 1111 or 1110 (1111 may be reserved to indicate that the block was not received correctly even with max number of transmissions) could be reserved to indicate that the number of retransmissions is unknown. It is best to reserve the codeword from the upper end because it is unlikely that 14 or 15 retransmissions would be allowed/required.

An advantage is that Node B need not guess the number of transmissions but it can simply inform that it does not know. OLPC in SRNC can then take this into account, e.g., by discarding the information. OLPC also knows that at least 3 retransmission were required and that Node B missed the first three (otherwise Node B would know the actual number of retransmissions). The SRNC can then use the signaling contained in the header for control purposes, for instance to make a decision related to one or more of its radio network control functions such as but not limited to controlling the power of a radio link between the base station (Node B) and the user equipment.

Another advantage is in a case where the UE is in soft handover (SHO) and different values are set to "Number of HARQ retransmissions" in received FP DATA FRAMEs from two or more Node Bs; if one of them has the proposed reserved codeword, RNC is able to ignore that value and use the correct value instead.

It should be noted, however, that in some SHO cases, different Node Bs can send different values for "Number of HARQ retransmission" which is 'normal'. This happens, e.g., when Node B1 receives the packet with two transmissions and forwards the data to RNC with "Number of HARQ retransmissions"=1 and sends ACK to UE. If this ACK is misinterpreted as NAK in the UE and UE (unnecessarily) retransmits the packet and now Node B2 receives it correctly and forwards it to RNC with "Number of HARQ retransmissions"=2 and sends ACK to UE. This is normal behavior and RNC should be able to handle this and take it into account in the OLPC.

FIG. 3(c) shows a second embodiment of the present invention with a new way of using the frame protocol (FP) header (part of the header) for E-DCH. For example, in the current FP specification, where there is one byte that firstly consists of a three-bit "Subframe number," a four-bit "Number of HARQ retransmissions" and a one-bit "Spare bit." According to the second embodiment of the present invention, the proposed one bit flag could use the 1 bit spare bit. The proposed one bit flag takes a value 0 or 1. As an example, the value "0" in the flag could indicate that the reported "Number of HARQ retransmissions" is a correct value and the value "1" in the flag could be used to indicate that the reported value is only an estimated value. It should be noticed that this 1 bit flag could also be placed in some other position in the FP header. The 'spare' bit was just used as an example.

Node B sets "0" in the flag in the forwarded FP DATA FRAME to the Serving Radio Network Controller (SRNC) in case the first packet that Node B decodes successfully (i.e. Node can read RSN of the packet) has RSN=0, 1, or 2, and
    the decoded packet is correct; or
    the decoded packet is not correct and when Node B receives correct packet which is retransmitted later after the reception of the first decoded packet.

Node B sets "1" in the flag in the forwarded FP DATA FRAME to SRNC in case the first packet that Node B decoded successfully (i.e. Node can read RSN of the packet) has RSN=3, and
    the decoded packet is correct; or
    the decoded packet is not correct and when Node B receives correct packet which is retransmitted later after reception of the first decoded packet and
    there is no other information that the Node B could use to determine the number of retransmissions.

An advantage of the second embodiment of the present invention is that the SRNC can know if the reported number of HARQ retransmissions (in the "Num of HARQ retrans" field is a correct value or a value estimated by the Node B. The information could be useful for improving OLPC (Open Loop Power Control).

Another advantage is in a case where the UE is in soft handover (SHO) and different values are set to "Number of HARQ retransmissions" in received FP DATA FRAMEs from two or more Node Bs; if one of them has the proposed flag=0, RNC is able to know which value is the correct value from the flag.

Figure 4:
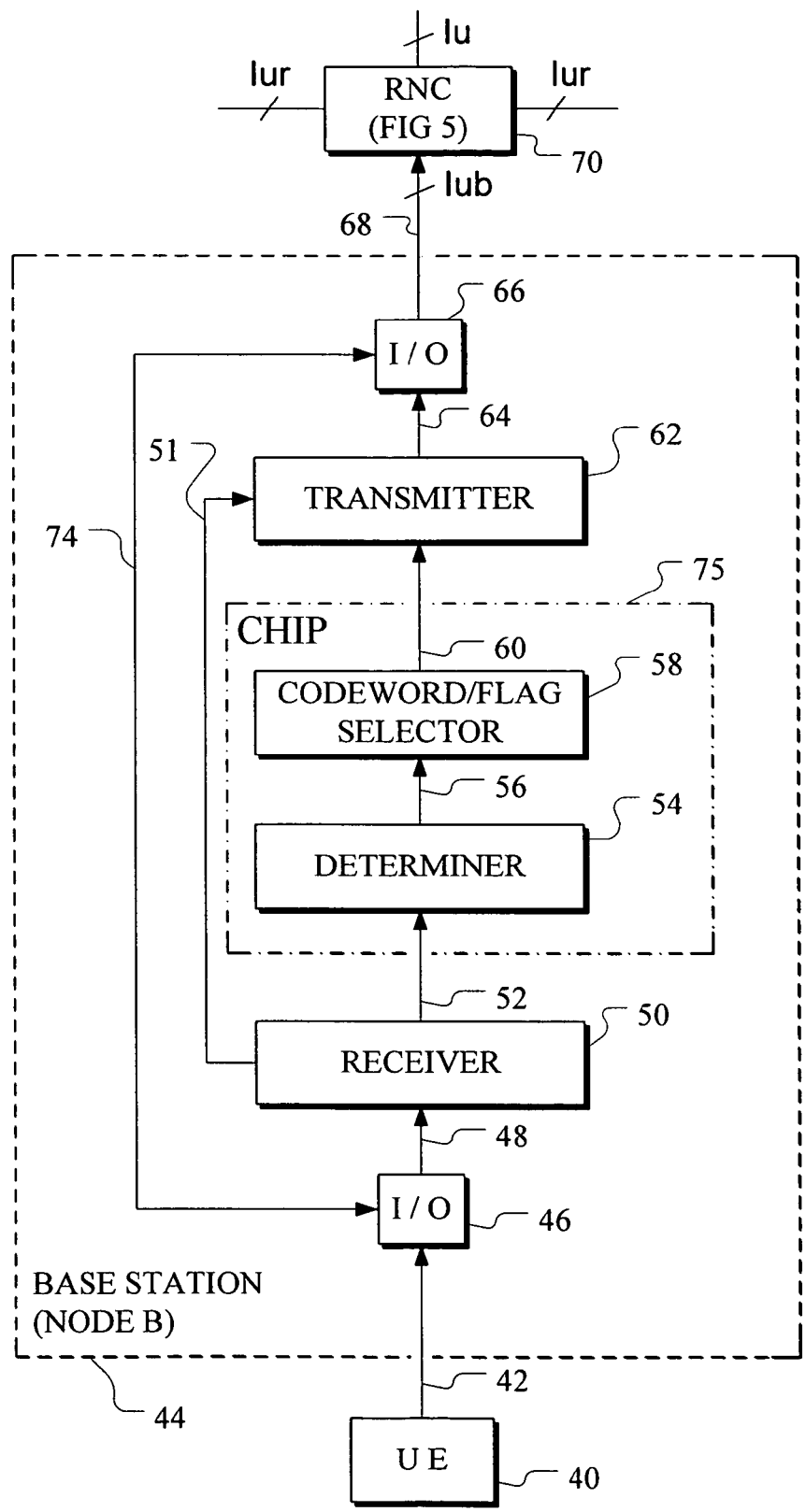
FIG. 4 illustrates an embodiment of a system including a combination of devices acting cooperatively, including a base station shown with details illustrating aspects of the present invention carried out therein.

FIG. 4 shows an embodiment of a system including a combination of devices acting co-operatively to carry out the invention and, more particularly, shows a base station (Node B) in such a system in more detail. A user equipment 40 is shown sending a retransmission sequence number signal on a line 42 to a base station 44 which has an input/output (I/O) device 46 responsive thereto. The I/O device 46 provides the retransmission sequence number signal on a line 48 to a receiver 50. The retransmission sequence number signal has a magnitude indicative of a number of retransmissions of data from the user equipment to the base station. The values of the number may be limited to a first range such as 0, 1, 2 and 3, i.e., the retransmission sequence number may be limited to two binary bits and be only capable of indicating up to four retransmissions but not more than that because of the limited number of bits available. The receiver 50 provides the retransmission sequence number signal or the value thereof to a determiner 54 which determines the number of retransmissions. It can easily do this for the first two examples described in the Background of the Invention section above even for some cases where the base station has received a retransmission sequence number with a maximum value of the above-mentioned range (0, 1, 2, 3). In such cases, the receiver 50 or some other related entity (such as the determiner 54) can provide the accurate retransmission number into the "Num of HARQ retrans" field in the header and transmit a frame on a line 51 to a transmitter 62 for transmission to the RNC.

However, for the third example given in the above-mentioned Background section, if the determiner 54 determines that the base station has received a retransmission sequence number for instance with a maximum value of said range and that the base station is unable to determine an accurate or exact count of retransmissions, it provides a signal on a line 56 indicative of that fact to a selector 58, which may for instance be a code word selector according to the first embodiment of the invention or, as another non-limiting instance, a spare bit flag selector according to the second embodiment. The selector 58, according to the first embodiment, selects a reserved code word which has been reserved from among a plurality of code words having values in a second range which is greater than the first range available to the user equipment. For instance, although the user equipment may be limited to two bits, the code words available on a base station for reporting to higher levels in the protocol hierarchy may have four bits allocated for that purpose. As suggested above, the reason for this is that the Node B may be able to actually ascertain the actual number of retransmissions e.g. beyond three (in a reliable manner) or it may be able to use other information available to it to reliably estimate the number of retransmissions. Thus the values of the code words may be indicative of an actual or estimated number of retransmissions of data from the user equipment to the base station. The reserved code word is used if such an actual or estimated number was indeterminate or if such an estimate would be unreliable. The reserved codeword is selected by the selector 58 and an indication thereof is provided as a signal on a line 60 to the transmitter 62 which in turn transmits a signal on a line 64 to an input/output device 66 with the reserved code word. The I/O device 66 in turn provides a signal on a line 68 with the reserved code word in a frame protocol data frame header to a radio network controller 70 which may be a serving radio network controller. If the RNC 70 is not a serving RNC, the RNC 70 sends the reserved code word to the serving radio network controller over an Iur interface to indicate that the base station does not have information about an actual number of the retransmissions of data from the user equipment to the base station. Although the base station 44 is shown with functional blocks for purposes of carrying out the present invention, it will be realized that many other functions are carried out in the base station and only those required to illustrate the functions carried out according to the present invention are shown in detail. It should also be realized that the RNC 70 and the user equipment 40 may communicate directly through the base station 44 and this fact is shown by a signal line 74 between the input/output devices 66, 46.

It should also be realized that the functional blocks illustrated may be carried out in software, hardware, or some combination of software and hardware. For instance, a chip 75 is shown in FIG. 4 to show that the determiner 54 and selector 58 could be combined in an integrated circuit. Or, the functions thereof could be carried out by execution of code stored in a computer-readable medium.

FIG. 4 is also useful in describing the second embodiment of the present invention. After receiving the signal on the line 52 from the receiver 50, the selector 58 selects a "1" bit for the spare bit as well as the value of the count for the "Num of HARQ retrans." The selector 58 selects a "1" bit for the spare bit to indicate that the count for the "Num of HARQ retrans" is only an estimate. In cases where the determiner 54 determines that the count is accurate, it can so inform the selector 58 and the spare bit flag is set to "0" to indicate an exact number of retransmissions is indicated in the "Num of HARQ retrans" field.

Figure 5:
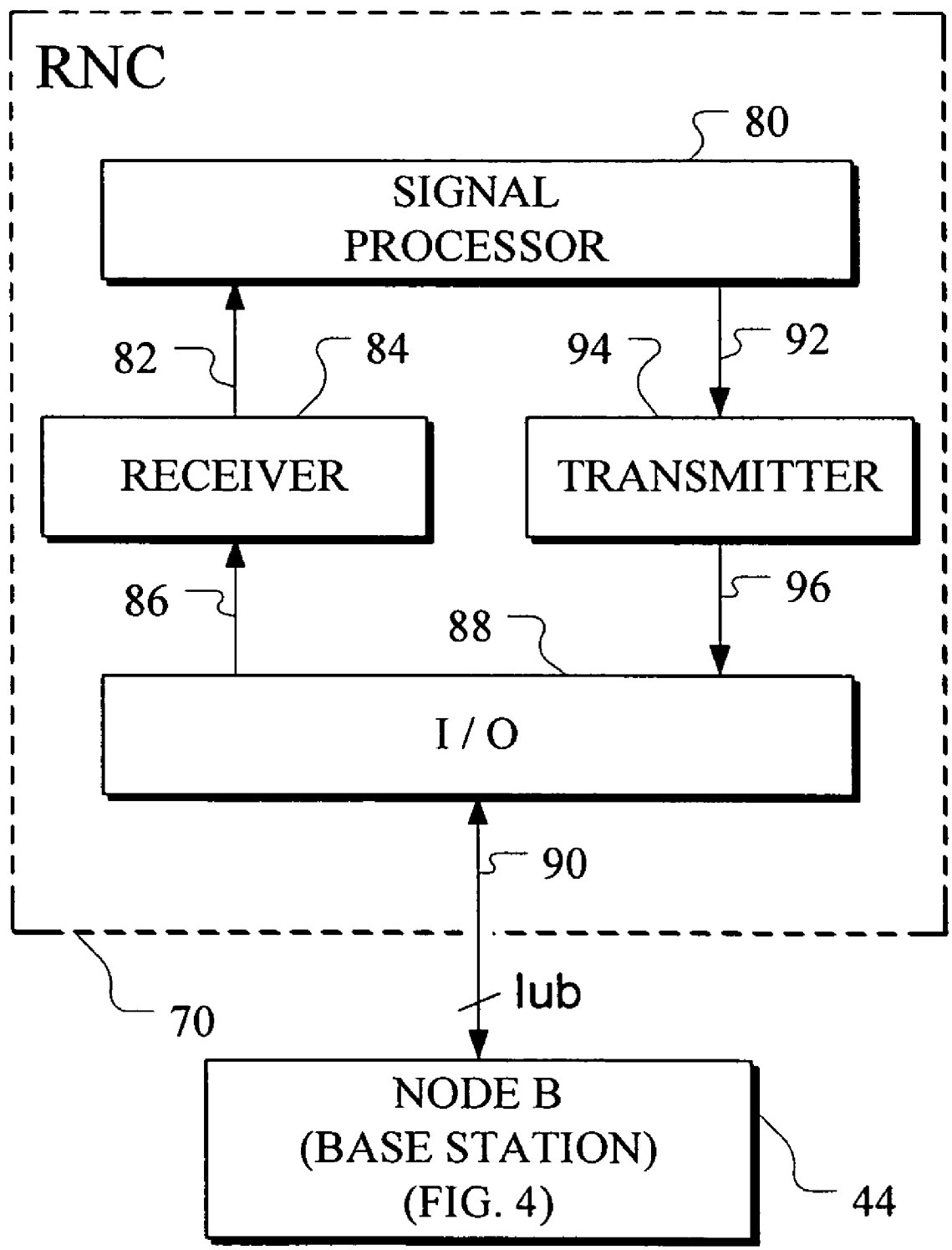
FIG. 5 shows the Radio Network Controller (RNC) of FIG. 4 in more detail.

Referring now to FIG. 5, the RNC 70 of FIG. 4 is shown in more detail. It includes a signal processor 80 responsive to a frame protocol data frame header signal on a line 82 from a receiver 84 which in turn has received the frame protocol data frame header on a signal line 86 from an input/output device 88 connected by a signal line 90 to the Node B 44. In response to the frame protocol data frame header from the base station, the signal processor 80 performs some control related function and then provides an output signal which may be a control signal on a line 92 provided to a transmitter 94 which in turn provides an output control signal on a line 96 to the input/output device 88 for transmission on the line 90 to the base station 44. The base station 44 uses the control signal to control for instance the power on the radio link 42 between itself and the user equipment 40. The value of the spare bit flag and/or the "Num of HARQ retrans" field contained in the frame protocol data frame header may be extracted by the input/output device 88, by the receiver 84 or the signal processor 80. The signal processor uses the flag and/or "Num of HARQ retrans" field to determine the actual or estimated number of retransmissions by the user equipment 40 to the base station 44 (or that none can be reliably estimated) and selects an appropriate control action on that basis. If the reserved code word 1111 or 1110 is used to indicate that the base station does not have reliable information on the number of retransmissions e.g. beyond the first range available for reporting by the UE 40, the signal processor 80 uses that fact in any appropriate manner to perform some function. Or, according to the second embodiment, if the spare bit flag is set to "0" it is informed the count contained in the "Num of HARQ retrans" field is accurate and if it is a "1" that it is only an estimate. What is important here is the fact that in some cases the signal processor 80 can be made aware of the fact that there have been a number of retransmissions but that the number is not known accurately. In the first embodiment only the fact that there is no exact number known is reported and no estimate is provided. In the second embodiment an estimate is provided along with the information that the estimate is just that, i.e., an estimate.

Although the invention has been shown and described with respect to a best mode embodiment thereof, it will be evident to those of skill in the art that various other devices and methods can be provided to carry out the objectives of the present invention while still falling within the coverage of the appended claims.

The invention claimed is:

1. Method for execution in a base station, comprising:
   receiving by a receiver in the base station over a radio interface from a user equipment a retransmission sequence number signal having a magnitude indicative of a number of retransmissions of data from the user equipment to the base station that resulted in a correct decoding of said data, wherein values of said number are limited to a first range,
   determining by a determiner in the base station if the base station has received a retransmission sequence number but has not been able to determine or has not been able to accurately determine the number of retransmissions of said data from the user equipment that resulted in said correct decoding of said data, and
   selecting signalling by a selector in the base station for transmission on a frame protocol data frame header to a serving radio network controller to indicate that the base station does not have information about an actual number of said retransmissions of data from the user equipment to the base station.

2. The method of claim 1, wherein said signalling comprises a reserved codeword reserved from among a plurality of codewords having values in a second range greater than said first range, said values of said codewords being indicative of a number of retransmissions of data from the user equipment to the base station, said reserved codeword for transmission on a frame protocol data frame header to a serving radio network controller to indicate that the base station does not have information about an actual number of said retransmissions of data from the user equipment to the base station.

3. The method of claim 2, wherein said reserved codeword is 1110.

4. The method of claim 2, wherein said reserved codeword is 1111.

5. The method of claim 2, wherein said reserved codeword is reserved from an upper end of said second range.

6. The method of claim 1, wherein said selecting signalling in the base station comprises selecting a value for a flag bit from among a plurality of bits in a codeword of said frame protocol data frame header, said value of said flag bit being indicative of whether a value for transmission in said header indicative of the number of retransmissions of data from the user equipment to the base station is actual or an estimate.

7. Base station, comprising:
   a receiver for receiving over a radio interface from a user equipment a retransmission sequence number signal having a magnitude indicative of a number of retransmissions of data from the user equipment to the base station that resulted in a correct decoding, wherein values of said number are limited to a first range,
   a determiner for determining in the base station if the base station has received a retransmission sequence number but has not been able to accurately determine the number of retransmissions of said data from the user equipment that resulted in said correct decoding and,
   a selector for selecting signalling for transmission on a frame protocol data frame header to a serving radio network controller to indicate that the base station does not have information about an actual number of said retransmissions of data from the user equipment to the base station.

8. The base station of claim 7, wherein said signalling comprises a reserved codeword reserved from among a plurality of codewords having values in a second range greater than said first range, said values of said codewords being indicative of a number of retransmissions of data from the user equipment to the base station, said reserved codeword for transmission on a frame protocol data frame header to a serving radio network controller to indicate that the base station does not have information about an actual number of said retransmissions of data from the user equipment to the base station.

9. The base station of claim 8, wherein said reserved codeword is 1111.

10. The base station of claim 8, wherein said reserved codeword is 1110.

11. The base station of claim 8, wherein said reserved codeword is reserved from an upper end of said second range.

12. The base station of claim 7, wherein said selector for selecting signalling in the base station comprises a selector for selecting a value for a flag bit from among a plurality of bits in a codeword of said frame protocol data frame header, said value of said flag bit being indicative of whether a value for transmission in said header indicative of the number of retransmissions of data from the user equipment to the base station is actual or an estimate.

13. Radio network controller for use in a network including a base station and user equipment having a radio link therebetween, comprising:
   a signal processor, responsive to a frame protocol data frame header from a base station for providing a control signal for a control function; and
   a transmitter, responsive to said control signal, for providing an output control signal to said base station for said control function, wherein said header may include signalling to indicate that the base station cannot determine an actual number of retransmissions of data from the user equipment over said radio link to the base station that resulted in a correct decoding of said data.

14. The radio network controller of claim 13, wherein said signalling uses a reserved codeword of said header to indicate that the base station does not have information about an actual number of said retransmissions of data from the user equipment to the base station.

15. The radio network controller of claim 13, wherein said signalling uses a flag in said header to indicate that the base station does not have information about an actual number of said retransmissions of data from the user equipment to the base station but also provides an estimate in a field of a codeword of said header used for reporting the number of retransmissions.

16. The radio network controller of claim 13, wherein said control function is for controlling power of said radio link between said base station and said user equipment.

17. A method for execution in a communication system, comprising:
   determining in a determiner of a first network element of said communication system a retransmission sequence number included in a last received data frame in a retransmission sequence received by a receiver of said first network element from a wireless terminal of said communication system that resulted in a correct decoding, said retransmission sequence number having a value in a first range of values, and
   a selector of said first network element selecting the value of the determined retransmission sequence number of the last received data frame that resulted in said correct decoding for insertion in a field of a frame protocol header of a data frame for reporting via a transmitter of said first network element said value of the determined retransmission sequence number to a second network element of said communication system for use in outer loop power control and if said value is a maximum value in said first range, inserting a value determined by said first network element in a second range of values greater than said first range of values but if said sequence number of the last received data frame that resulted in said correct decoding cannot be determined by said first network element, inserting the value fifteen so as to indicate to said second network element that the retransmission sequence number of the last received data frame that resulted in said correct decoding is unknown.

18. An integrated circuit, comprising:
   a determiner for installation in a first network element in order to determine a retransmission sequence number included in a last received data frame in a transmission sequence from a wireless terminal to said first network element that resulted in a correct decoding, said retransmission sequence number having a value in a first range of values; and
   a selector for selecting the value of the determined retransmission sequence number of the last received data frame that resulted in said correct decoding for insertion in a field of a frame protocol header of a data frame for reporting said value of the determined retransmission sequence number to a second network element for use by said second network element in outer loop power control, and if said value is a maximum value in said first range, said selector inserting a value determined by said first network element in a second range of values greater than said first range of values, but if said sequence number of the last received data frame that resulted in said correct decoding cannot be determined by said first network element, inserting the value fifteen so as to indicate to said second network element that the retransmission sequence number of the last received data frame that resulted in said correct decoding is unknown.

19. An integrated circuit, configured to operate in a base station having a receiver for receiving over a radio interface from a user equipment a retransmission sequence number signal having a magnitude indicative of a number of transmissions of data from the user equipment to the base station that resulted in a correct decoding, wherein values of said number are limited to a first range, said integrated circuit configured to operate as a determiner for determining if the base station has received a retransmission sequence number but has not been able to accurately determine the number of retransmissions of said data from the user equipment that resulted in said correct decoding and, said integrated circuit configured to operate as a selector for selecting signalling for transmission on a frame protocol data frame header to a network element to indicate that the base station does not have information about an actual number of said retransmissions of data from the user equipment to the base station.

20. The integrated circuit of claim 19, wherein said signalling comprises a reserved codeword reserved from among a plurality of codewords having values in a second range greater than said first range, said values of said codewords being indicative of a number of retransmissions of data from the user equipment to the base station, said reserved codeword for transmission on a frame protocol data frame header to the network element to indicate that the base station does not have information about an actual number of said retransmissions of data from the user equipment to the base station.

21. The integrated circuit of claim 19, wherein said selector for selecting signalling in the base station comprises a selector for selecting a value for a flag bit from among a plurality of bits in a codeword of said frame protocol data frame header, said value of said flag bit being indicative of whether a value for transmission in said header indicative of the number of retransmissions of data from the user equipment to the base station is actual or an estimate.

22. A signal processor configured to operate in a radio network controller in a network including a base station with a radio link to user equipment, said signal processor responsive to a frame protocol data frame header from said base station for providing a control signal for a control function for transmission to said base station for said control function, wherein said data frame header may include signalling to indicate that the base station cannot determine an actual number of retransmissions of data from the user equipment over said radio link to the base station that resulted in a correct decoding of said data for use by said signal processor in providing said control signal for said control function.

23. The signal processor of claim 22, wherein said signalling uses a reserved codeword of said header to indicate that the base station does not have information about an actual number of said retransmissions of data from the user equipment to the base station.

24. The signal processor of claim 22, wherein said signalling uses a flag in said header to indicate that the base station does not have information about an actual number of said retransmissions of data from the user equipment to the base station but also provides an estimate in a field of a codeword of said header used for reporting the number of retransmissions.

25. The signal processor of claim 22, wherein said control function is for controlling power of said radio link between said base station and said user equipment.

26. A signal processor for carrying out a method, comprising:
receiving in a first network element over a radio interface from a user equipment a retransmission sequence number signal having a magnitude indicative of a number of retransmissions of data from the user equipment to the first network element that resulted in a correct decoding of said data wherein values of said number are limited to a first range,
determining in the first network element if the first network element has received a retransmission sequence number but has not been able to determine or has not been able to accurately determine the number of retransmissions of said data from the user equipment that resulted in said correct decoding of said data, and
selecting signalling in the first network element for transmission on a frame protocol data frame header to a second network element to indicate that the first network element does not have information about an actual number of said retransmissions of data from the user equipment to the first network element.

27. The signal processor of claim 26, wherein said signalling comprises a reserved codeword reserved from among a plurality of codewords having values in a second range greater than said first range, said values of said codewords being indicative of a number of retransmissions of data from the user equipment to the first network element, said reserved codeword for transmission on a frame protocol data frame header to the second network element to indicate that the first network element does not have information about an actual number of said retransmissions of data from the user equipment to the first network element.

28. The signal processor of claim 26, wherein said selecting signalling in the first network element comprises selecting a value for a flag bit from among a plurality of bits in a codeword of said frame protocol data frame header, said value of said flag bit being indicative of whether a value for transmission in said header indicative of the number of retransmissions of data from the user equipment to the first network element is actual or an estimate.

* * * * *

UNITED STATES PATENT AND TRADEMARK OFFICE
CERTIFICATE OF CORRECTION

| | |
|---|---|
| PATENT NO. | : 7,668,192 B2 |
| APPLICATION NO. | : 11/323467 |
| DATED | : February 23, 2010 |
| INVENTOR(S) | : Malkamäki et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1037 days.

Signed and Sealed this

Seventh Day of December, 2010

David J. Kappos
*Director of the United States Patent and Trademark Office*